United States Patent [19]

Marks

[11] Patent Number: 5,225,861

[45] Date of Patent: Jul. 6, 1993

[54] APPARATUS FOR PROJECTION OF THREE-DIMENSIONAL IMAGES

[76] Inventor: Mortimer Marks, 166-25 Cryders La., Whitestone, N.Y. 11357

[21] Appl. No.: 643,550

[22] Filed: Jan. 18, 1991

[51] Int. Cl.$^5$ .................................. G03B 35/24
[52] U.S. Cl. ...................... 353/7; 359/472; 359/471; 359/473; 352/61
[58] Field of Search ................ 353/7, 8, 9, 10; 350/130, 131, 133, 138, 139, 137; 358/3, 88; 352/61, 60, 57; 359/471, 472, 473, 475, 462, 464

[56] References Cited

U.S. PATENT DOCUMENTS

| | | | |
|---|---|---|---|
| 1,930,228 | 10/1933 | Draper | 350/131 |
| 2,307,276 | 1/1943 | Keyzer | 350/131 |
| 2,313,947 | 3/1943 | Klinkum | 350/131 |
| 3,425,775 | 2/1969 | Jacobsen | 352/57 |
| 4,671,632 | 6/1987 | August | 353/7 |
| 4,872,750 | 10/1989 | Morishita | 353/7 |

FOREIGN PATENT DOCUMENTS

| | | | |
|---|---|---|---|
| 0122804 | 11/1946 | Australia | 351/61 |
| 0206474 | 2/1909 | Fed. Rep. of Germany | 352/61 |

Primary Examiner—William A. Cuchlinski, Jr.
Assistant Examiner—William C. Dowling
Attorney, Agent, or Firm—Handal & Morofsky

[57] ABSTRACT

An apparatus for presentation of apparent three-dimensional images without special viewing glasses is disclosed. A projection system projects right and left stereo images from a stereoscopic slide so that the right stereo image and the left stereo image become superimposed relative to one another on a viewing screen. The viewing screen comprises light transmissive slit-raster members and a light diffusion member. The viewing screen is adapted to allow the right and left stereo images to pass between the opaque raster members and be perceived only by the right and left eyes, respectively, of the viewer as the left image formed in a raster-like manner on the diffusion member is blocked by further opaque raster members and prevented from being perceived by the right eye and the right stereo image also formed in a raster-like manner on the diffusion member is blocked by the further opaque raster members and prevented from being perceived by the left eye. Thus, the right eye sees only the right stereo image and the left eye sees only the left stereo image thereby replicating the binocular human vision as the brain interprets the two points of view observed by the right and left eyes as a three-dimensional image.

17 Claims, 8 Drawing Sheets

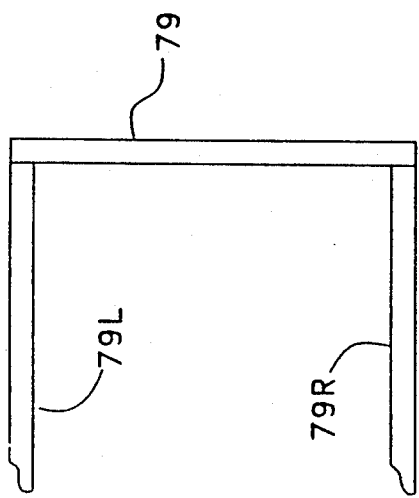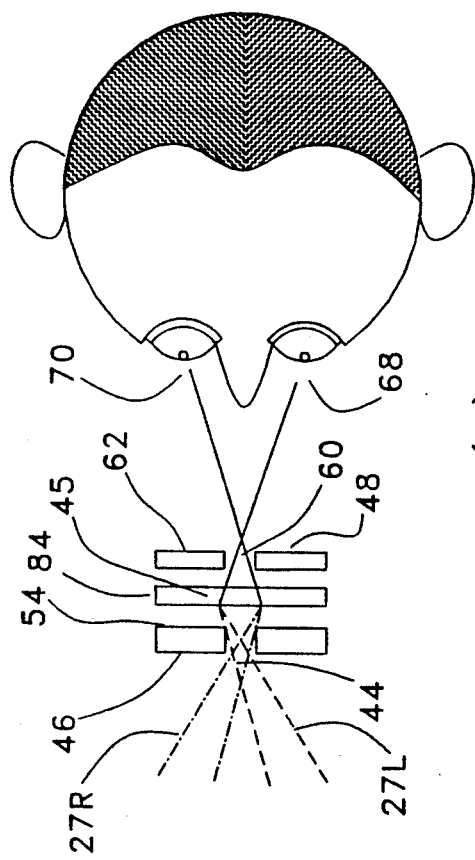
FIGURE 1(b)
FIGURE 1(c)

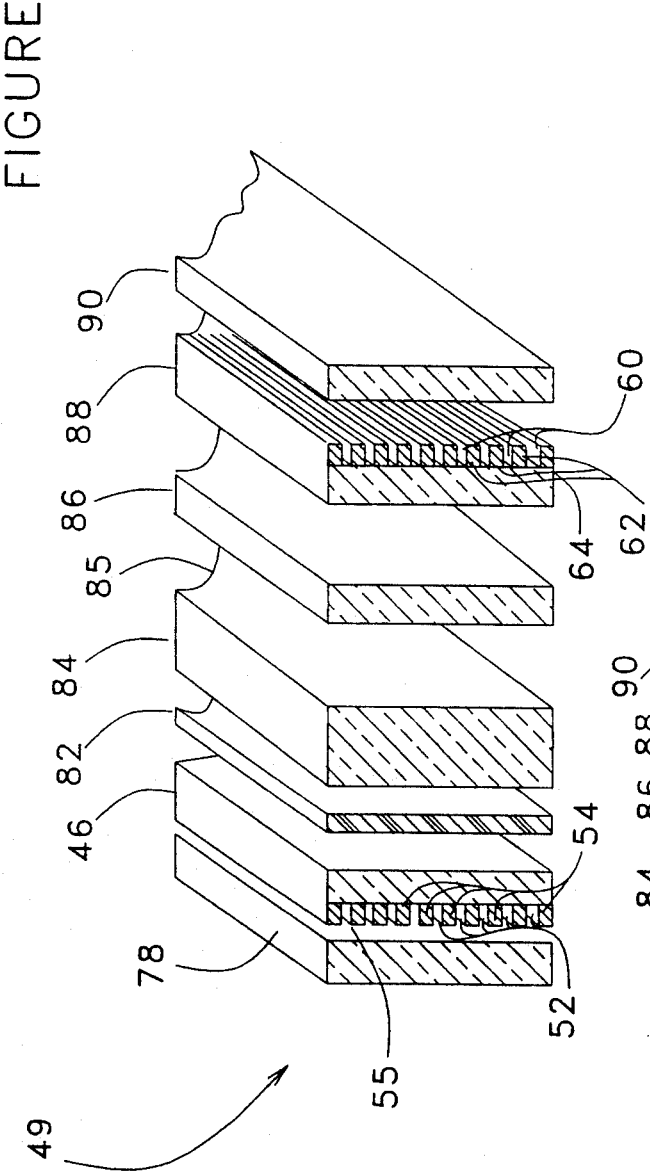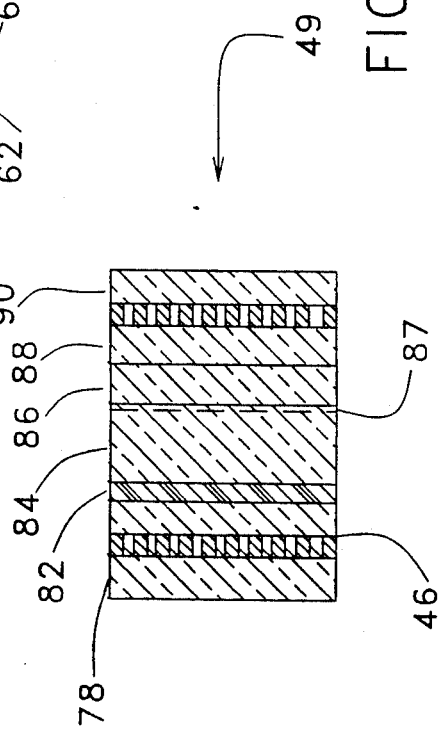

APPARATUS FOR PROJECTION OF THREE-DIMENSIONAL IMAGES

BACKGROUND

The physiological perception of three-dimensional information by the human brain is a complex phenomenon. Generally, numerous inputs are received by the human brain and integrated with logical operations and experience to generate the perception of a picture of the outside world in three dimensions.

One way of presenting three-dimensional information to a viewer is to simulate binocular vision and provide a pair of pictures with a variation of the perceived scene corresponding to changes in point of view. Because the right and left eyes both see a given scene from different points in space, the positions of various objects with respect to each other in the images created by the lenses of the left and right eyes on their respective retinae are different, and the scene is perceived in three dimensions.

This may be understood if one considers two spherical objects of equal size positioned in space along a line which also includes the left eye of a viewer. The left eye of the viewer will see only the object (the "first object") which is nearer to it.

On the other hand, if the other spherical object is sufficiently distant from the first spherical object, it will be completely visible to the right eye of the viewer. In contrast, if the objects are somewhat closer together, part of the other object will be occulted by the nearer object. If the other object is positioned closer and closer to the nearer object, progressively more of the other object may be occulted until, depending upon the size of the objects relative to the distance from the viewer and the interocular separation, only a sliver of the other spherical object will be visible. Thus, each of the eyes produces and sends to the brain a different picture of the outside world.

Experience is used by the brain to evaluate the relative positions of elements on the basis of the images produced by the right and left eyes. By evaluating such things as the amount of an object that is visible, relative perceived object positions and perceived object sizes, three-dimensional information can be reconstructed with the resultant perception of a three-dimensional scene.

Thus, one way of producing a three-dimensional effect is to photograph a scene using two cameras separated by from 60 to 75 mm, a distance roughly corresponding to the average human interocular distance, that is the distance between the human eyes. Just as each human eye would view the scene at a slightly different point of view relative to the other eye, each camera in this system photographs the scene from a slightly different point of view relative to the other camera to generate right and left images.

To achieve separation, the images may be colored so that one image will have substantially one color, for example red, while the other image will have substantially another color, for example green. The right and left images may then be projected and seen only by the right and left eyes of the viewer, respectively, through the use of a pair of eyeglasses with red and green lenses.

When a viewer wearing these glasses views the scene produced as above, the green lens of the glasses will filter out and prevent the viewer's right eye from seeing the image of the scene that is green, and the red lens will filter out and prevent the viewer's left eye from seeing the image of the scene that is red. Thus, each eye observes the scene from the point of view it would in the real world and the brain interprets the scene as three dimensional.

These glasses have lenses that are colored to correspond to the color of one of the images. In particular, if the image taken with the right camera is substantially red, the lens in the glasses that is in front of the viewer's left eye is red, If the image taken with the left camera is substantially green, the lens in the glasses that is in front of the viewer's right eye is green. Colors may be selected to give some perception of full color.

If a true full-color three-dimensional display is desired, the two images produced by the two cameras may be positioned on a single frame of film such that the image from one camera is positioned directly above the image from the second camera.

To view the scene, the full-color images would be projected, for example, onto a movie screen. The image on the top corresponding to the image taken by one of the cameras and the image on the bottom corresponding to the image taken by the other camera are projected by a projection system which projects the corresponding right and left images so that they are substantially superimposed with respect to each other on the screen. However, the light from the top image is filtered to have a polarization orientation which is perpendicular to the light of the bottom image.

To see the desired three-dimensional effect, a viewer must wear special glasses with a pair of polarizing filters which each match a respective one of the polarizations of the light from the top and bottom recorded images.

Thus, with polarized lens glasses, each eye would look through a lens polarized at a 90° angle from the lens for the other eye and each eye perceives only one of the stereoscopic images.

A great disadvantage with these systems for projection of three-dimensional scenes is the necessity of the use of special glasses. The viewer must wear the special glasses in order to perceive the three-dimensional effect.

SUMMARY OF THE INVENTION

The invention is intended to provide a remedy. It solves the problem of how to provide realistic three-dimensional representations without the use of special glasses while providing both realism and a high degree of viewer comfort.

In accordance with the invention, an apparatus for the presentation of three-dimensional images without the need for special viewing glasses is disclosed. A projection lens projects light containing the image from a stereoscopic slide having two images disposed on it. The images comprise a right stereo image disposed on one half of the stereoscopic slide and a left stereo image disposed on the other half of the stereoscopic slide. Image pairs are positioned next to each other during initial original photography (for example, with a stereoscopic camera), or they are brought together with particular relative positions horizontally and vertically during reprinting of the slide or slides involved.

The invention contemplates the use of two images, a left and a right image, on the same slide, film frame or other source which are split into discrete left and right beams. The beams are both projected through screening means to interact on a diffusion glass screen.

The invention lends itself to three-dimensional portrayal of slide, motion picture and projected television images.

During projection, light emanating from the two images is treated separately as it exits from the projection lens. A first prism displaces the apparent position of the source of one of the images with respect to the other image.

In accordance with the disclosed embodiments, the first stereo image leaves a beam splitting second prism and is projected directly towards the viewing screen. The second stereo image is deflected by the prism towards a mirror. The mirror is rotatably mounted and positioned relative to the prism to reflect the second stereo image to a beam deflecting prism adapted to deflect the reflected second stereo image so that the second stereo image and the first stereo image become roughly superposed relative to one another on the viewing screen.

The viewing screen comprises a light transmissive masking member composed of a plurality of opaque stripes disposed between the projection optics and a light diffusion member on which the right and left images are projected. The plurality of opaque stripes are disposed vertically. A slit raster is thus defined between each of the plurality of opaque members thereby causing the projection of images in the form of a plurality of elongated image members, but with the image members forming the right image being positioned on the light diffusion screen at positions different from the position at which left image members are positioned. The light diffusion member is a light transmissive sheet made of glass, plastic, or the like. The light diffusion member is coated with a material adapted to diffuse the light containing the right and left stereo image. Finely ground silica may be used for this purpose. A second complementary masking member comprising a second set of opaque raster members is disposed on the other side and selectively presents one of the images to the respective one of the viewer's eyes. Thus, the images are produced on the viewing screen to be perceived in three dimensions by the viewer.

As alluded to above, the right and left stereo images disposed on the stereoscopic slide are usually made by filming a scene simultaneously through two cameras separated in the horizontal plane by a distance substantially equal to the interocular separation between human eyes or a greater distance if a distant scene is to be recorded with a three-dimensional effect. The images produced by the inventive apparatus on the viewing screen are thus stereoscopic, that is, the right and left images superposed on each other on the viewing screen depict the same scene from points of view replicating the effect of the binocular vision of the human eyes.

The positions of the slit-raster forming opaque members are selected to allow the portion of the right stereo image passed to the diffusion member image to pass between the second set of opaque raster members and reach the right eye along the line of sight of the right eye. Conversely, the position of the left stereo image is blocked for the right eye by the second opaque raster members and prevented from reaching the right eye along the line of sight of the right eye.

In similar fashion, the opaque stripes of the second masking member are positioned to allow the left stereo image to pass and reach the left eye along the line of sight of the left eye, while at the same time, the right stereo image is blocked and prevented from reaching the left eye along the line of sight of the left eye. Thus, the right eye sees only the right stereo image and the left eye sees only the left stereo image. The brain interprets the two points of view observed by the right and left eyes as a three-dimensional image.

BRIEF DESCRIPTION OF THE DRAWINGS

One way of carrying out the invention is described in detail below with reference to drawings which illustrate only particular specific embodiments of the invention and in which:

FIG. 1(b) is a side view of the projection optics portion of FIG. 1(a);

FIG. 1(c) is a schematic representation, greatly enlarged of a portion of FIG. 1(a), illustrating its operation;

FIGS. 3 and 3A are partial schematic representations in exploded perspective of viewing screens of the inventive system;

FIGS. 4 and 4A are partial schematic top views of the viewing screens of FIGS. 3 and 3A;

FIG. 5 is a partial schematic top view of a alternate embodiment of a screen for use in the inventive system;

BEST MODE FOR CARRYING OUT THE INVENTION

Figure 1A:
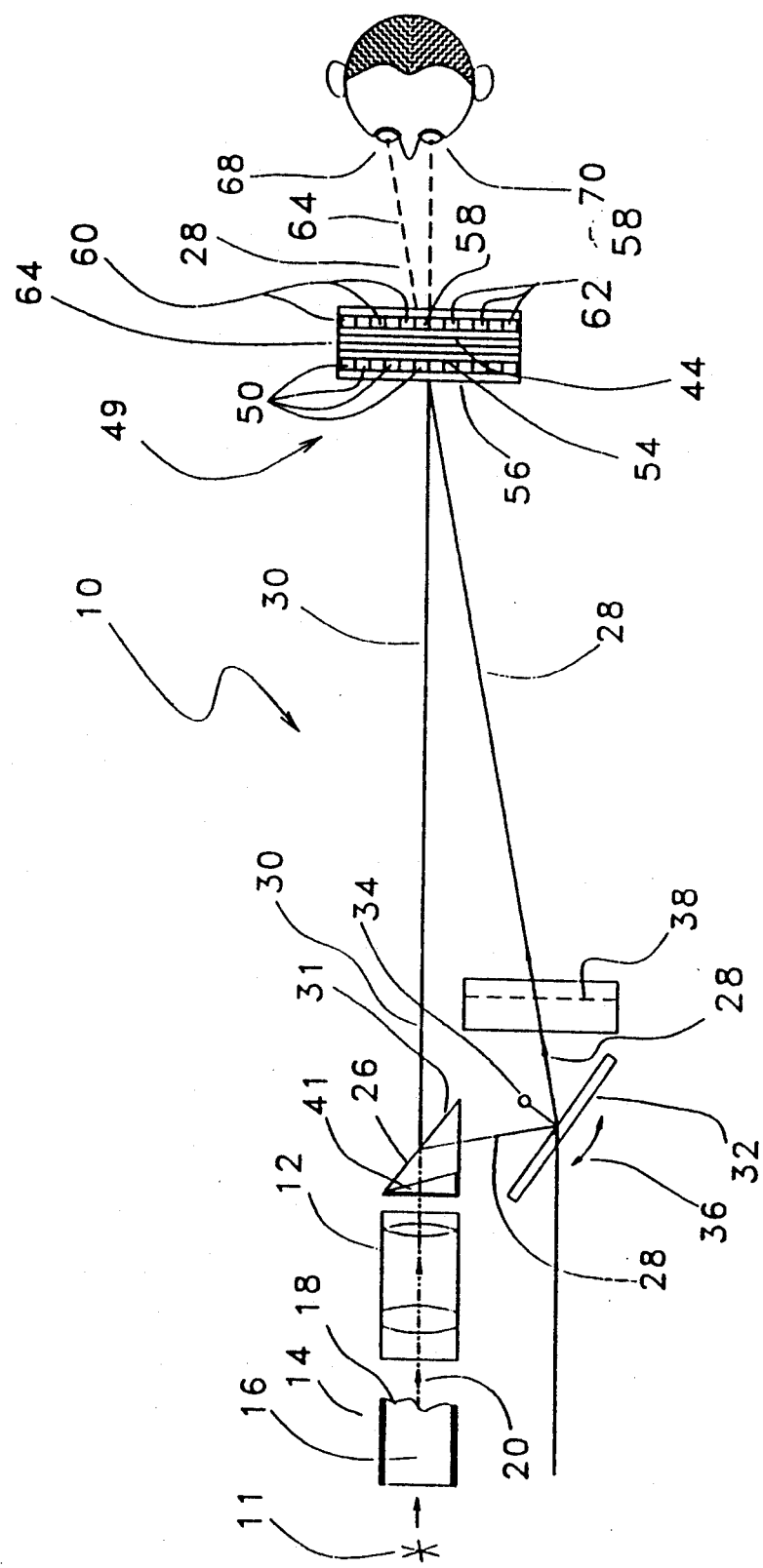
FIG. 1(a) is a top plan view schematically depicting the operation of the inventive system.

Referring to FIGS. 1(a) and 1(b), the inventive system 10 has a projection lens 12, which projects images along projection path 20 from a standard 35 mm (18 mm × 35 mm) stereoscopic slide frame 14 illuminated by light source 11.

Projection lens 12 is of conventional design and may comprise a number of lenses.

Figure 2:
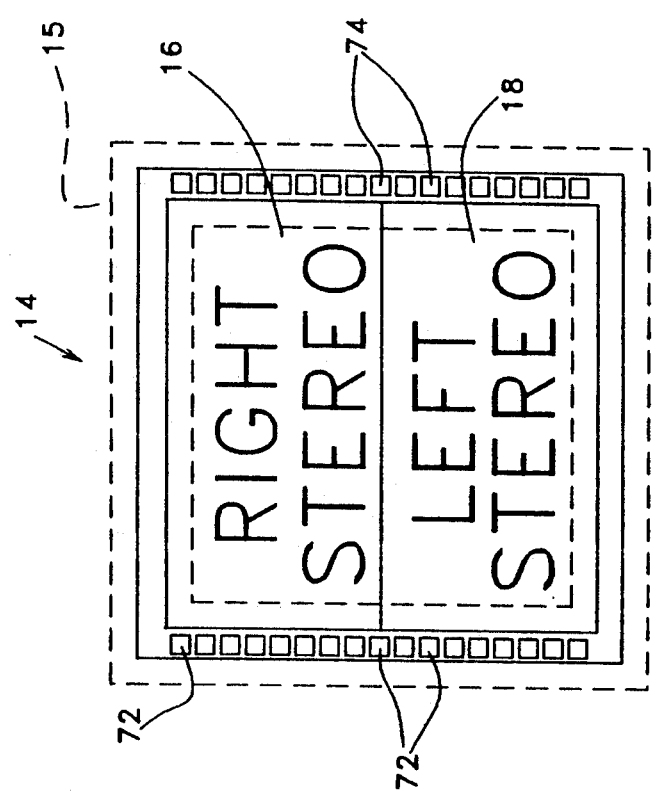
FIG. 2 is a front view of a stereoscopic slide used in conjunction with the inventive system.

As illustrated in FIG. 2, stereoscopic slide frame 14 has two images, a right stereo image 16 and a left stereo image 18, disposed on it. Light from right stereo image 16 and left stereo image 18 is coupled along path 20 from stereoscopic slide frame 14, through projection lens 12 and prism 41.

A portion of the light is coupled along path 28 below prism 41, through a totally internally reflecting prism 26 to provide light for forming a projected image of right stereo image 16. This is in contrast to path 30, along which light for forming a projected image of left stereo image 18 is coupled. Right stereo image 16, after passing through prism 26 and being reflected by reflective surface 31, is reflected by a mirror 32. Mirror 32 is pivotally mounted at tilt adjust member 34 (FIG. 1(b)) and pivots in the directions indicated by arrows 36 and 37.

Light from right stereo image 16, travelling along path 28, next passes through 11.4 cm achromatic prism 38 and is angularly displaced to shift upwardly the projected image of right stereo image 16 a distance equal to on half the length of stereoscope slide frame 14. Prism 38 also equalizes the optical path length for the left and right projected images. The light 27R which forms a projected image of right stereo image 16, FIG. 1(c), as represented by line 28, may next coupled through filter, which performs the function of image density correction.

Light 27L, which forms the projected image of left stereo image 18, travels along path 20 through prism 41, which performs the function of moving the image. The light which forms right stereo image 16 and left stereo image 18 passes through slits 52 of a first slit-raster member 46 of the inventive screen 49. First slit-raster member 46 is comprised of a plurality of slits 52 defined between a plurality of opaque members 54 attached to a transparent support member 56. Projection lens 12 is positioned to project the image of left stereo image 18 centered on screen 49. Thus, the projected right and left stereo images overlap on a diffusion screen 84 positioned between first slit-raster member 46 and a second slit raster member 48.

To understand the operation of the inventive system, it can be seen from FIG. 1(c) that a point on the projected image of right stereo image 16, travelling along paths 20R and 28 and the projected image of a point on left stereo image 18, travelling along paths 20L and 30 are imaged respectively at points 44 and 45 on diffusion screen 84. Slit-raster member 48 is similarly comprised, as slit-raster member 46 by a plurality of slits 60 defined between a plurality of opaque members 62 attached to transparent support member 64. In similar fashion, because slit 60 is narrow, it allows line of sight to the left eye 70 only of point 45 and allows line of sight to the right eye 68 only of point 44. The geometry of the system constrains this for all points on screen 84. In accordance with the preferred embodiment, a depth improving convex optic member (e.g., one with a focal length of 2-3 diopters) may be used. See FIG. 1(c).

Referring to FIG. 2, stereoscopic slide 14 is illustrated. While stereoscopic slide 14 can be in a variety of formats, such as still slides in a cardboard holder 15 and the like, a frame from a three-dimensional motion picture or still film strip comprising a series of right and left frame pairs is also possible. While the orientation and positioning of right stereo image 16 and left stereo image 18 may be varied, a typical orientation and positioning is illustrated in FIG. 2. Right stereo image 16 is inverted and positioned above the inverted left stereo image 18 on stereoscopic slide 14. If a film strip is used, the plurality of cutouts 72 and 74 conventionally provided to accommodate a film advancing mechanism of a projector may be used to achieve successive display of desired pictures or frames.

Reference is now made to FIGS. 3 and 4, which are enlarged without preserving relative dimensions in order to precisely illustrate the details of construction. FIG. 3 is a diagrammatic representation in exploded perspective of slit-raster screen 49. FIG. 4 is a side view of slit-raster screen 49. In accordance with one preferred embodiment of the invention, slit-raster screen 49 is comprised of a first protective member 78 which can be any light transmissive material such as glass or plastic or the like. Protective member 78 is positioned adjacent first slit-raster member 46 and followed by a clear film member 82 which can be any light transmissive material such as mylar, glass, plastic or the like. Diffusion glass screen 84 is maintained in position by film member 82 and a second such member such as a clear glass member 86. Finally, the second slit-raster member 88 is protected by second protective member 90.

The slit-raster members 46 and 88 comprise a 0.0002 meter thick film such as Mylar brand film with thin opaque members 54, deposited thereon. Opaque members 54 may be formed by starting with a metalized Mylar film and etching away portions of the metal layer to leave behind the desired members 54. Opaque member 55 is approximately twice to three times the width of the slits and, in this embodiment, the opaque members have a width 55 measuring from about 0.015 cm to 0.025 cm in width. Accordingly, 30 to 50 lines per centimeter are required. Opaque members may have a thickness of only 0.00025 cm or less. Clear film member 82 is 0.02 cm thick. Diffusion glass screen 84 is a 0.12 cm thick piece of float glass having a diffusion side 85 that has been ground with a 500 grit optical grinding powder and treated with diffusion agent such as a lacquer containing flat silica particles to form a diffusion layer 87 which is about 0.005 cm thick, or less. Clear glass member 86 is 0.15 cm thick and preferably made of float glass.

The dimensions in the embodiment contemplate a combined projection and viewing distance of approximately 1500 to 3700 mm, for a standard interocular distance, and beam separation of approximately 60 to 75 mm, and preferably 65 to 70 mm between mirror 32 and prism 26. The separated beams travel approximately 300 to 1600 mm to reach the screen. However, the beam points of projection separation can be increased to enhance the effect.

In forming the opaque member 54 illustrated in FIG. 4 by photo etching on Mylar film, a significant degree of diffusion of the light passing through the clear areas between the opaque members has been noted. Additionally, difficulties in keeping the Mylar film flat during assembly poses further problems. Misalignment of the opaque members often occurs on Mylar or most other plastics which leads to the appearance of shadows when the head of the viewer moves.

Producing lines on the inside of protective member 78 can to some extent reduce diffusion and warping problems and avoid misalignment of the opaque members.

Figures 4A, 5:
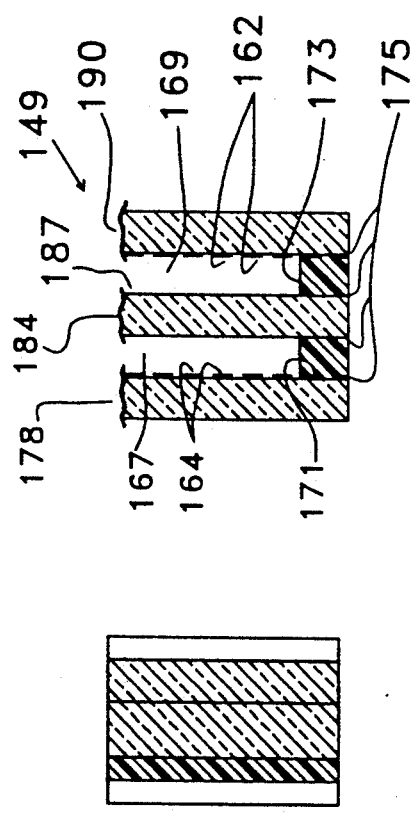
Figure 3A:
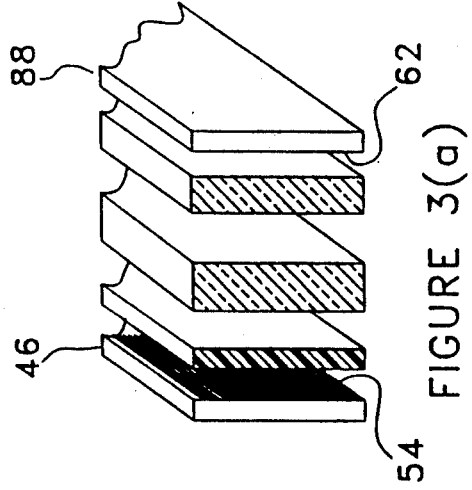

The viewing screen of FIGS. 3 and 4 may be simplified by eliminating protective members 78 and 90 and turning slit-raster members 46 and 88 around so that opaque members 54 and 62 are not exposed, as shown in FIGS. 3A and 4A. In FIGS. 3A and 4A, opaque members 54 and 62 are not quite so exaggerated as in FIGS. 3 and 4.

FIG. 5, where analogous elements may be numbered with numbers which vary from the numbers of the embodiment of FIGS. 1-4 by multiples of 100, illustrates the structure of an alternative slit-raster screen 149 of the invention. End plate masks 178 and 190 and diffusion glass screen 184 are each float glass of about 0.3 cm thickness. End plate masks 178 and 190 have opaque members 154 and 162, respectively, on their interior faces. Masks 178 and 190 are formed by vacuum deposition of the opaque members onto the float glass.

Air spaces 167 and 169 are each 0.3 cm thick and are formed by peripheral spacers 171 and 173, respectively. These spaces may be greater or less than 0.3 cm. depending on distance of the screen from the lens and the viewer. Joints 175 of thermoplastic cement allow realignment of the masks 154 and 162 and diffusion glass screen 184 upon heating of the cement.

After cooling, the masks and screen 184 will stay in alignment. The opaque members in this embodiment are to be 2 to 2.5 times the width of the slits between the opaque members, preferably 2.2 times the width. Approximately 120 lines per centimeter are disposed on the end plate raster pieces.

Diffusion glass screen 184 is treated with a optical grinding powder in the same manner as screen 84 in the embodiment of FIG. 1-4 and given a diffusion coating 187. The diffusion coating is disposed on the side of diffusion glass screen 184 nearest the viewer. As the diffusion coating is on the viewer side, the diffusion glass member may provide spacing sufficient to eliminate air space 166 and spacer 170, depending on projection distance and projection lens focal length, etc. A diffusion screen such as that sold by the Stewart Screen Co. of California, or a similar type may be used. Generally, the diffusion screen is selected for as high a resolution as possible.

Figure 6:
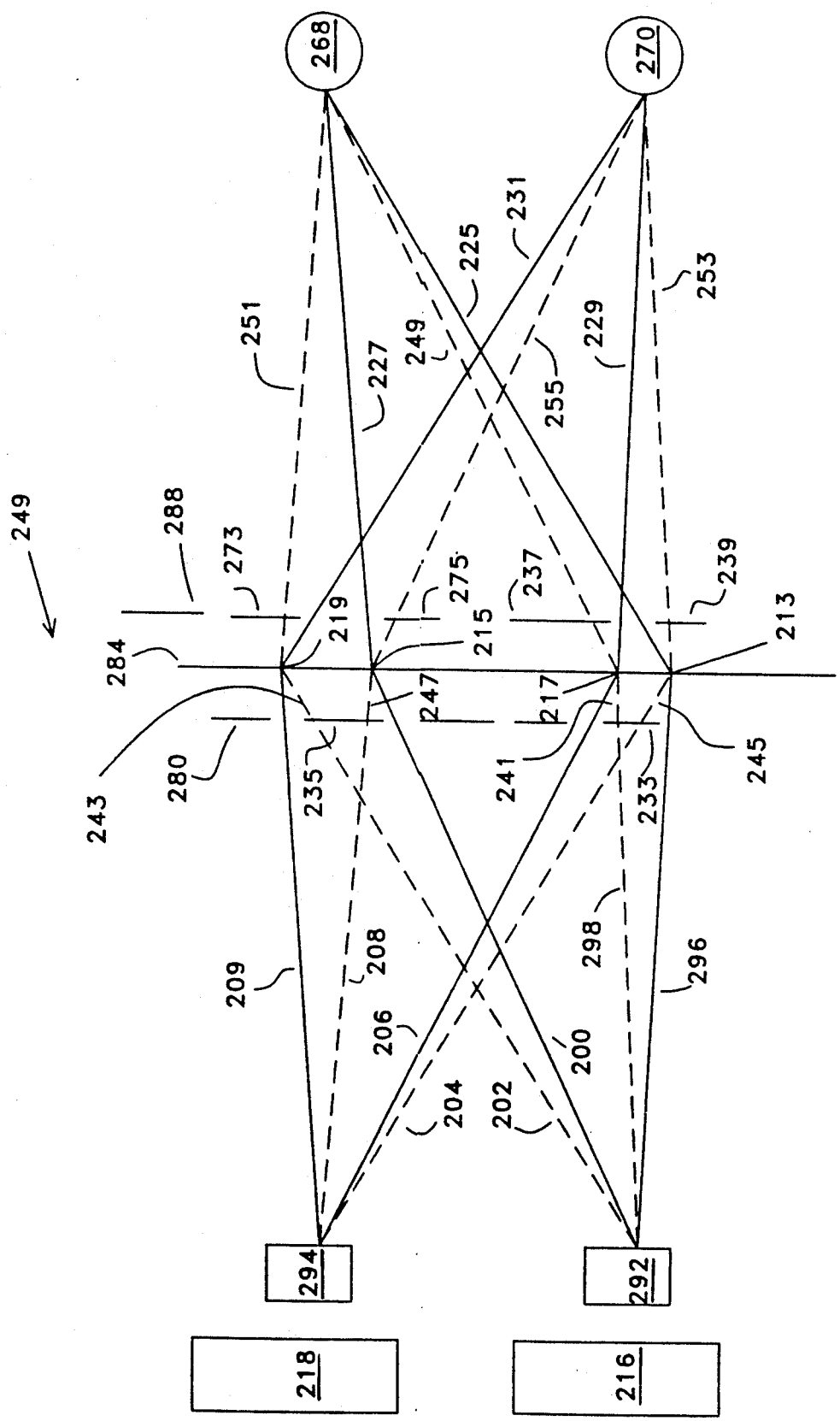
FIG. 6 is a diagrammatic representation of an alternative embodiment of the inventive system illustrating its operation.

FIG. 6 is a diagrammatic representation of an alternative embodiment of the invention. Here placement of the points of projection is achieved by alternate means which comprises two separate projection optics 292 and 294 which are positioned to individually project images of right and left images 216 and 218 respectively. Slit-raster screen 249 provides the desired separate present of right and left images in a manner similar to the embodiments of FIGS. 1-5. Right stereo image 216 is projected from first projection optics 292 and left stereo image 218 is projected from second projection optics 294. To illustrate, light from right stereo image 216 is depicted by representative light rays 296, 298, 200 and 202, and light from left stereo image 218 is depicted by representative light rays 204, 206, 208 and 209. The distance from first projection source 292 and second projection source 294 to slit-raster screen 249 and the distance from the screen to the viewer have been abbreviated and relative proportions varied to clearly illustrate the principle of operation. In accordance with the embodiments of FIGS. 1-6, these distances are about 1.2 meters. The actual distance between the projector and the screen may be shortened using other mirror systems or a shorter focal length projection lens.

Right stereo image 216, represented by rays 296, strikes diffusion glass member 284 of slit-raster screen 249 and produces a perceivable image at point 213 that is perceived by right eye 268 along right line of sight line 225. Similarly, right stereo image 216, which produces ray 200, strikes diffusion glass member 284 of screen 249 and produces a perceivable image at point 215 that is perceived by right eye 268 along right line of sight line 227. The left stereo image 218, which produces, by way of example, ray 206, which strikes diffusion glass screen 284 of screen 249 and produces a perceivable image at point 217 that is perceived by left eye 270 along left line of sight line 229. Similarly, left stereo image 218, which emits ray 209, strikes diffusion screen 284 and produces a perceivable image at point 219 that is perceived by left eye 270 along left line of sight line 231. Right stereo image 216, emits ray 298, which strikes opaque member 233 and is blocked from striking diffusion screen 284 at point 217. Dashed line 241 represents the extrapolated path of ray 298 and shows that the right and left projected images are kept separate. Similarly, right stereo image 216 emits ray 202, which strikes opaque member 235 and is blocked at point 219 from striking screen 284. Dashed line 243 represents the extrapolated path of ray 202.

Left stereo image 218 emits ray 204, which strikes opaque member 233 at point 213 and is blocked from striking diffusion screen 284 of screen 249. Dashed line 245 represents the extrapolated path of ray 204. In similar fashion, left stereo image 218 emits light ray 208, which strikes opaque member 235 and is blocked at point 215 from striking diffusion screen 284. Line 247 represents the extrapolated path of ray 208.

Right eye 268 perceives, along right line of sight line 225 the image of right stereo image 216, created by light ray 296, projected on diffusion screen 284 at point 213. Similarly, right eye 268 perceives along right line of sight line 227 the image of right stereo image 216, created by light ray 200, projected on diffusion screen 284 at point 215. Left eye 270 perceives along left line of sight line 229, the image of left stereo image 218, created by light ray 206 projected on diffusion screen 284 at point 217. Similarly, left eye 270, perceives along left line of sight line 231, the image of left stereo image 218 created by light ray 209 projected on diffusion screen 284 at point 219. Right eye 268 is blocked from perceiving point 217 on diffusion screen 284 along right line of sight line 249 by opaque raster member 237. Similarly, right eye 270 is blocked by opaque raster member 273 from perceiving point 219 on diffusion glass member 284 along right line of sight line 251. Left eye 270 is blocked from perceiving point 213 on diffusion screen along left line of right line 253 by opaque raster member 239. Similarly, left eye 270 is blocked by opaque raster member 275 from perceiving point 215 on screen 284 along left line of sight line 255.

Left and right images as perceived by the left and right viewer eyes will be discreet images. When the left and right images are separated in passing through prisms 26 and 41, light containing the right image emerging along path 28, from the internally reflecting prism 26, will contain some light from left image 18. However, because the system is contained in a housing 79, such light will fall on a light absorbing inner surface 79L. In similar fashion, the unwanted light from the right image passing through prism 41 will fall on and be absorbed by inner surface 79R.

Figure 7:
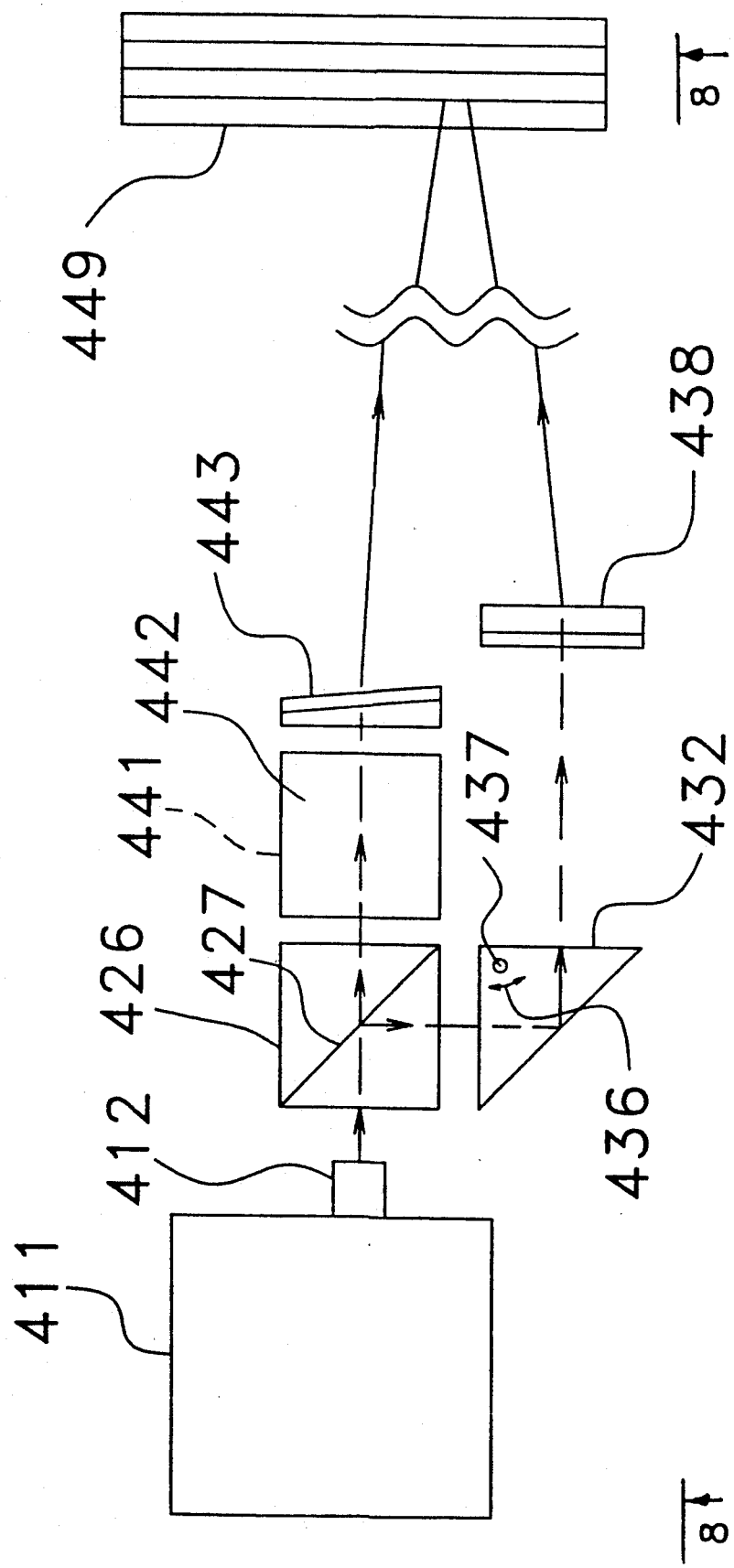
FIG. 7 is a top plan view of particularly advantageous projection optics for the system of the present invention.

Turning to FIG. 7, in accordance with this embodiment, a slide projector or television projector type apparatus 411, including a focusing lens 412, contains a stereo slide or other source which emits light toward beam-splitting cube 426 which is simply a cube of glass with a half-silvered diagonal surface 427 contained therein. Part of the light from focusing lens 412 is deflected by surface 427 toward totally internally reflecting prism 432 which directs the light through a four and one half degree achromatic wedge 438. The image is then directed toward the screen. Prism 432 may be adjusted in the directions indicated by arrow 436 by rotation about pivot point 437 upon which prism 432 is mounted.

Figure 8:
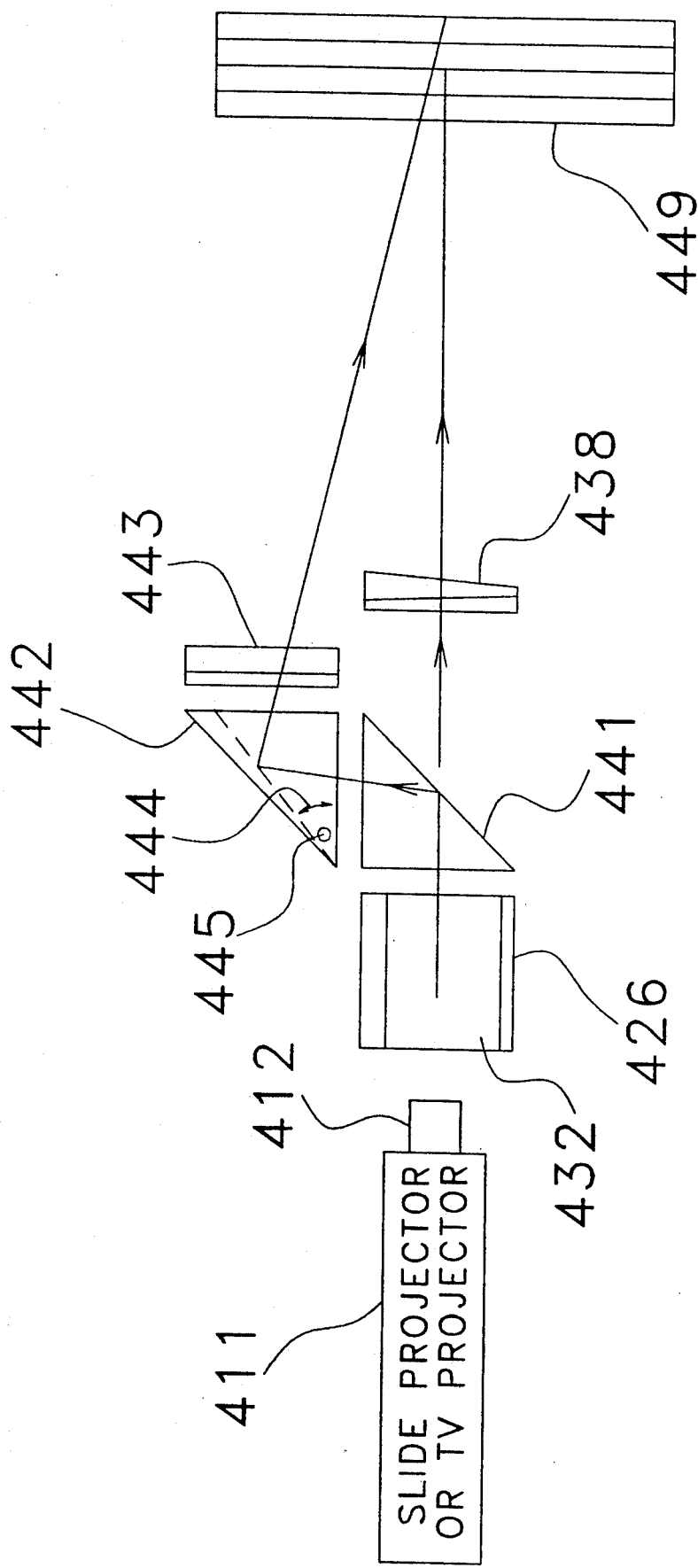
FIG. 8 is a view along lines 8—8 of FIG. 7.

In like fashion, part of the light passes through surface 427 and proceeds toward prism 441 which reflects it upwardly toward prism 442 as illustrated in FIG. 8. The light is totally internally reflected within prisms 441 and 442 as illustrated in FIG. 8. After the light is totally internally reflected within prisms 441 and 442, it passes through a four and on half degree achromatic wedge 443 towards screen 449. The angle of prism 442 is adjusted in the directions indicated by arrow 444 by rotation about pivot point 445 upon which wedge 442 is mounted for rotation. The two light paths are equalized by the use of appropriate air paths and glass thickness to provide equal focus upon imaging at the screen.

The coincidence of images on screen 449 can be achieved in the horizontal direction by adjustment about pivot point 437. Likewise, coincidence in the vertical direction can be achieved by adjustment of prism 442 about pivot point 445.

The delivery system provides two ray systems providing left and right stereo images from a source approximating the interocular distances between the eyes. While the preferred embodiment involves projection of images from points at the interocular separation, this distance can be varied. More importantly, the provision of a three-dimensional unit for viewing without glasses in accordance with the invention and in which the three-dimensional unit is relatively small and self-contained depends upon the use of a relatively small separation between the sources. The smaller that this separation is, the smaller the distance between the projection points of the image sources and the viewing screen. However, as can be seen from inspection of FIGS. 1(a) and 1(c), for example, even with greater separation of the sources of the projected image, a smaller projection path length can be accommodated by varying the distance between the shadow lines in projection screen which shade the projected image before it falls upon the diffusion screen.

I claim:

1. An apparatus for the presentation of apparent three-dimension images comprising:
   a) illumination means for producing a steroscopic image having two component images;
   b) a projector lens for focusing said stereoscopic image;
   c) image processing means for separating said stereoscopic image into said two component images of said stereoscopic image and directing said two component images to arrive at a predetermined target area, said image processing means, comprising:
   (i) a beam splitting cube for receiving the output of said projector lens;
   (ii) a first prism for receiving light passed by said beamsplitting cube and reflecting it in a different direction;
   (iii) a second prism for receiving light from said first prism and reflecting it in a first direction; and
   (iv) a third prism for receiving light reflected by said beamsplitting cube and reflecting it generally in said first direction; and
   d) a viewing screen positioned at said predetermined target area comprising:
   (i) a projection-side screening means for selectively blocking portions of said two component images;
   (ii) a diffusion member having a diffusion surface for displaying the portions of said two component images passing through said projection-side screening means said projection-side screening means being positioned between said diffusion member and said image processing means; and
   (iii) a viewer-side screening means positioned on a side of said diffusion member opposite said projection side screening means for presenting the displayed portions of said two component images to a binocular viewer such that one eye of said binocular viewer will perceive substantially only the displayed portion of one of said two component images and the other eye of said binocular viewer will perceive substantially only the displayed portion of the other of said two component images.

2. Apparatus as in claim 1, wherein said second and third prisms are mounted for rotation and may have their positions varied to achieve horizontal and vertical coincidence of projected component images.

3. An apparatus for the presentation of apparent three-dimensional images as claimed in claim 1, wherein said image processing means separates said component images by a distance in the range of 60 to 75 mm for a 900 to 1600 mm convergent path to the target area.

4. A apparatus for the presentation of apparent three-dimensional images as claimed in claim 1, wherein said projection-side screening means and said viewer side screening means comprise opaque vertical stripes with intervening optically transparent slits on an optically transparent substrate.

5. An apparatus for the presentation of apparent three-dimensional images as claimed in claim 4, wherein said vertical stripes are between two and three times the width of said slits.

6. An apparatus for the presentation of apparent three-dimensional images as claimed in claim 5, wherein said vertical stripes are approximately 2.2 times the width of said slits.

7. An apparatus for the presentation of apparent three-dimensional images as claimed in claim 5, wherein said vertical stripes number at least 75 lines per inch.

8. An apparatus for the presentation of apparent three-dimensional images as claimed in claim 7, wherein said vertical stripes number approximately 300 lines per inch.

9. An apparatus as in claim 1, wherein said image processing means further comprises:
   v) a first achromatic wedge for horizontal adjustment of the light passing from said second prism; and
   vi) a second achromatic wedge for vertical adjustment of the light passing from said third prism.

10. An apparatus as in claim 9, wherein said first achromatic wedge and said second achromatic wedge are both four and one half degree wedges.

11. An apparatus as in claim 1, wherein the light of the two separated component images travels less than 300 mm to said viewing screen and the component images are separated by less than 60 mm allowing reduction in size of said apparatus.

12. An apparatus for the presentation of apparent three-dimensioned images comprising:
   a) an image projector;
   b) image separation means configured, dimensioned and positioned to separate a stereoscopic image from said projector into the two component images of said stereoscopic image, said image separation means, comprising;
   i) a beam splitting cube;
   ii) a first prism for receiving light passed by said beamsplitting cube and reflecting it upwardly;
   iii) a second prism for receiving light from said first prism and reflecting it in a first direction;
   iv) a third prism for receiving light reflected by said beamsplitting cube and reflecting it generally in said first direction;
   c) an image director means configured, dimensioned and positioned to cause said two component images to converge at a predetermined convergence site; and
   d) a viewing screen, positioned at said predetermined convergence site, said viewing screen comprising:

i) a diffusion member having a diffusion surface for displaying the converged component images;

ii) a projection-side, slit-raster member configured, dimensioned and positioned to cause the two component images to form vertical raster-like images on said diffusion surface; and iii) a viewer-side, slit-raster member configured, dimensioned and positioned such that a binocular viewer may perceive substantially only one of said two component images with one eye and substantially only the other of said two component images with the other eye.

13. An apparatus for the presentation of apparent three-dimensional images comprising:

a) illumination means for presenting a stereoscopic image having two component images;

b) a projector lens for focusing said stereoscopic image;

c) image processing means for separating said stereoscopic image into said two component images of said stereoscopic image and directing said two component images along respective optical paths to arrive at a predetermined target area; said image processing means comprising:

i) a totally internally reflecting prism positioned to reflect one of said two component images;

ii) an adjustable mirror to receive the reflected one of said two component images and reflect said one of said two component images towards said predetermined target area;

iii) a first achromatic prism to correct the final optical path length and direction for said one of said two component images;

iv) a second achromatic prism to correct the final optical path direction for the second of said two component images; and d) a viewing screen positioned at said predetermined target area comprising:

i) a projection-side masking means for selectively blocking portions of said two component images;

ii) a diffusion member having a diffusion surface for displaying the portions of said two component images passing through said projection-side masking means; and iii) a viewer-side masking means for presenting the displayed portions of said two component images to a binocular viewer such that one eye of said binocular viewer will perceive substantially only the displayed portion of one of said two component images and the other eye of said binocular viewer will perceive substantially only the displayed portion of the other of said two component images.

14. Apparatus as in claim 13, wherein said first achromatic prism adjusts the projection of said one of said two component images to match the vertical placement of said second of said two component images at said target area.

15. Apparatus as in claim 13, wherein said adjustable mirror and said second achromatic prism adjust said first and said second of said two component images, respectively, to match the horizontal placement of said first and said second of said two component images at said target area.

16. Apparatus as in claim 13, wherein said adjustable mirror and said second achromatic prism are spacially separated by a distance of 60 to 75 mm.

17. Apparatus as in claim 16, wherein said adjustable mirror and said second achromatic prism are situated 900 to 1600 mm from said target area.

* * * * *